(12) United States Patent
Powell et al.

(10) Patent No.: US 9,219,395 B2
(45) Date of Patent: Dec. 22, 2015

(54) LARGE MAGNETICALLY GEARED MACHINES

(75) Inventors: David James Powell, Sheffield (GB); Stuart David Calverley, Sheffield (GB)

(73) Assignee: Magnomatics Limited, Sheffield (GB)

( * ) Notice: Subject to any disclaimer, the term of this patent is extended or adjusted under 35 U.S.C. 154(b) by 470 days.

(21) Appl. No.: 13/698,849

(22) PCT Filed: May 17, 2011

(86) PCT No.: PCT/GB2011/000754
§ 371 (c)(1),
(2), (4) Date: Feb. 7, 2013

(87) PCT Pub. No.: WO2011/144895
PCT Pub. Date: Nov. 24, 2011

(65) Prior Publication Data
US 2013/0134815 A1  May 30, 2013

(30) Foreign Application Priority Data

May 17, 2010  (GB) .................................. 1008211.3
Aug. 16, 2010  (GB) .................................. 1013731.3

(51) Int. Cl.
*H02K 15/00* (2006.01)
*H02K 7/18* (2006.01)
(Continued)

(52) U.S. Cl.
CPC ............. *H02K 7/1823* (2013.01); *H02K 16/02* (2013.01); *H02K 21/04* (2013.01); *H02K 21/38* (2013.01); *H02K 7/11* (2013.01); *H02K 21/14* (2013.01); *H02K 51/00* (2013.01)

(58) Field of Classification Search
USPC ................... 310/101, 103, 112, 114, 156.36, 310/156.37, 266
See application file for complete search history.

(56) References Cited

U.S. PATENT DOCUMENTS 4,785,213 A * 11/1988 Satake .......................... 310/116
5,838,085 A * 11/1998 Roesel et al. ................. 310/113
(Continued)

FOREIGN PATENT DOCUMENTS

FR      1560584        3/1969
WO   WO 2007/125284   11/2007
(Continued)

OTHER PUBLICATIONS

Atallah et al., "A Novel High-Performance Magnetic Gear", IEEE Transactions on Magnetics, 2001, 37(4), 2844-2846.
(Continued)

*Primary Examiner* — Thanh Law
(74) *Attorney, Agent, or Firm* — Baker & Hostetler LLP (57) ABSTRACT

An electrical machine is provided comprising a first rotor (121), wherein the first rotor includes a support structure (163), a second rotor (131), a stator (141) and, wherein the first rotor, second rotor and stator are arranged concentrically about a shaft (50), and at least one of the second rotor and the stator is adapted to accommodate the support structure. An electrical machine is also provided comprising a shaft (50) having an axis, at least one first rotor (321), at least one second rotor (331), at least two stators (341*a*), (341*b*) and, wherein the first rotor, second rotor and stators are arranged axially along the shaft and extend from the axis.

24 Claims, 11 Drawing Sheets (51) Int. Cl.
*H02K 16/02* (2006.01)
*H02K 21/04* (2006.01)
*H02K 21/38* (2006.01)
H02K 21/14 (2006.01)
H02K 51/00 (2006.01)
H02K 7/11 (2006.01)

(56) References Cited

U.S. PATENT DOCUMENTS 6,455,976 B1 * 9/2002 Nakano ............... 310/216.114
6,639,337 B1 * 10/2003 Nakano ..................... 310/113
7,215,059 B1 * 5/2007 Bitsche et al. ............. 310/269
7,723,886 B2 * 5/2010 Huber et al. ............. 310/102 R

FOREIGN PATENT DOCUMENTS

| WO | WO 2009/087408 | 7/2009 |
| WO | WO 2009/130456 | 10/2009 |
| WO | WO 2009/138728 | 11/2009 |
| WO | WO 2009/147377 | 12/2009 |

OTHER PUBLICATIONS

Atallah et al., "Design, Analysis and Realisation of a High Performance Magnetic Gear", IEEE Proceedings-Electric Power Applications, Mar. 2004, 151(2), pp. 135-143.
International Patent Application No. PCT/GB2011/000754: International Search Report and Written Opinion dated Jan. 17, 2012, 22 pages.

* cited by examiner

LARGE MAGNETICALLY GEARED MACHINES

CROSS-REFERENCE TO RELATED APPLICATIONS

This application is the National Stage of International Application No. PCT/GB2011/000754 filed May 17, 2011, which claims the benefit of Great Britain Application No. 1008211.3, filed May 17, 2010, and Great Britain Application No. 1013731.3, filed Aug. 16, 2010, the disclosures of which are incorporated herein by reference in their entireties.

The present invention relates to magnetically geared machines, especially large scale magnetically geared machines for use in energy generation or propulsion.

Electric motors or generators with integrated magnetic gearing are smaller than equivalent direct drive machines and eliminate the requirement for a mechanical gearbox (offering benefits in terms of reliability and efficiency). They are an attractive solution for wind turbines, marine current turbines and marine propulsion systems, etc.

Useful power levels for utility scale renewable energy generation in, for example, wind turbine or marine current generators are in the order of megawatts and the speeds of rotation of the input shaft are typically very low, up to 15 rpm. For marine propulsion systems in, for example, diesel electric ships useful power levels range up to 10s of megawatts (MW) per turbine. The speeds of rotation of the output shaft are in the order of 50-150 rpm. Therefore, the torques required are typically extremely large ($P=\omega T$), can be of the order of mega-Newton-meters (MNm) and are of similar magnitude for both systems.

Traditionally, in order to match a motor to high torque loads or a generator to high torque drives, a mechanical gearbox is used to increase the rotational speed to or from the mechanical load or drive respectively, stepping down torque. This enables a more compact motor or generator (e.g. operating >1000 rpm) to be employed as the required active airgap area and hence size of an electrical machine is dependent on the required torque. However, the use of mechanical gearboxes introduces significant disadvantages in terms of sealing, lubrication, reliability and servicing. It also introduces further losses such as, for example, frictional losses between cogs in the gears, which can take up a significant proportion of the available power when working at low loads, thus reducing efficiency further.

One solution to at least some of the above issues is to employ a gearbox using the principle of magnetic gearing in which the rotational forces, or torques, are transmitted across an airgap through the interaction of magnetic fields. Magnetic gears do not have contacting surfaces, or engaging teeth, and do not require transmission oil. Thus there is no lubrication to be replaced periodically, and the bearing lubrication circuits can also be highly optimised. A further benefit is that magnetic gears have concentric rotating shafts and as a result forces within them tend to be more balanced; relieving the stress on the bearings and thus allowing for significant improvements in bearing longevity. The magnetic gear system is therefore robust and highly reliable. Magnetic gears also eliminate friction losses due to contacting teeth and are highly efficient. Hence, as an alternative to a mechanical gearbox, the drive from a turbine, for example, could be input to a single stage of magnetic gearing and the output therefrom could be connected to a conventional medium or high speed generator, as outlined in WO/2007/125284.

However, it is possible to integrate (both magnetically and mechanically) magnetic gears within an electrical motor/generator. This allows a more compact combined unit, which uses less permanent magnetic material (which has significant cost per unit mass) than a separate magnetic gear and permanent magnet excited motor or generator.

Figure 1:
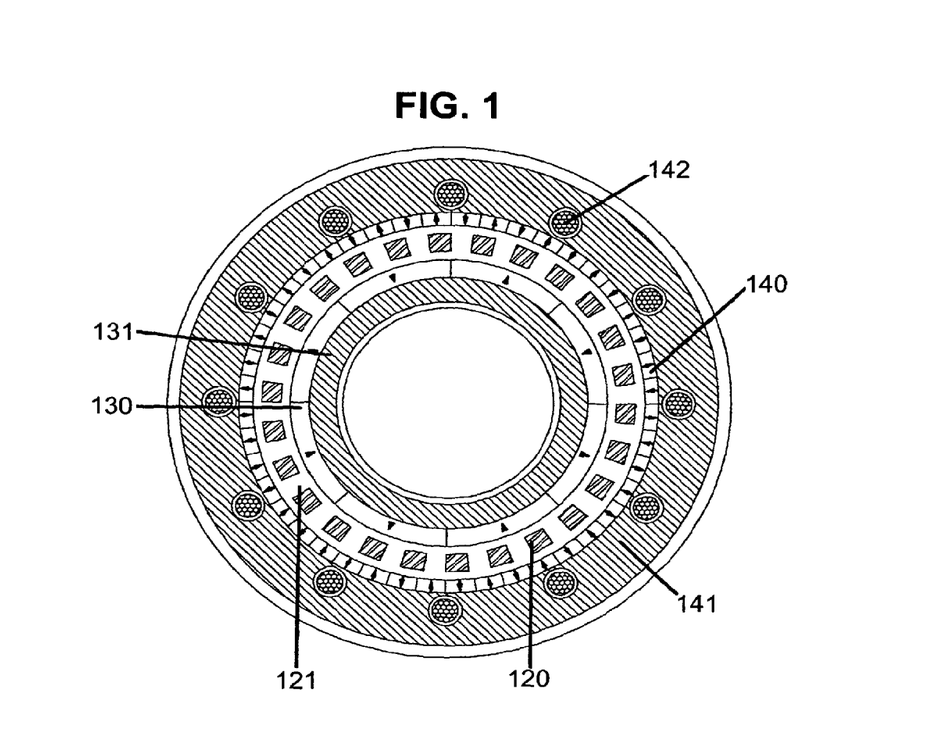
FIG. 1 shows a sectional view of a radial field magnetically geared machine.

Such an electrical motor or generator with integral magnetic gearing is shown in FIG. 1 and converts the low speed rotation of a load or prime mover on a first input/output rotor 121 to a high speed rotation of a second rotor 131, which is free to rotate in relation to the input/output rotor and provides excitation flux to interact with a winding 142 in the stator. Permanent magnets 130 on the second rotor 131 interact with a spatial harmonic which is produced due to a combination of static permanent magnets 140 and the pole pieces 120 disposed on the first rotor 121 to produce magnetic gearing between the first rotor 121 and the second rotor 131. For example, in motor use, the fundamental spatial flux of the second rotor interacts with the stator windings. The first, pole-piece, rotor modulates this flux to create a higher order harmonic which has the same pole-number as the static magnets. As the second rotor rotates the first, pole-piece, rotor, and hence the load, is forced to rotate.

An electrical machine's ability to produce torque is determined by the achievable "shear force density" in the airgap (a function of magnetic field flux density and the currents in the stator windings) which is limited by material properties (e.g. maximum flux densities achieved by permanent magnets and/or due to the saturation levels in the steels in the magnetic circuit) and thermal limits due to losses induced due to non-perfect winding conductors. In order to achieve a large torque, the machine rotor surface area must therefore be large.

Realisation of pole piece rotors in larger machines is very challenging. The radial thickness of the pole-pieces is selected to provide the optimum modulation of the permanent magnet rotor magnetic fields while preventing significant leakage and avoiding magnetic saturation. Typically pole-pieces are small in the radial dimension relative to the rotor diameter, for example in a 0.5 m diameter rotor the pole-piece radial thickness may be of the order of 5-20 mm thick and in a 3 m diameter rotor the pole-piece's radial thickness may be only 20-50 mm. Therefore the pole piece rotor is typically a relatively thin walled annular structure.

Although to achieve very high torques it is preferable to increase the machine diameter (with advantages of increased area and torque arm effect) in some cases the diameter is constrained due, for example, to limits on available space, high speed operation requiring smaller diameters to reduce peripheral speeds and centrifugal forces or difficulties in handling/machining/transporting large components. Therefore, it may be necessary to increase the axial length of the machine and hence the pole-piece rotor.

To achieve a certain gear ratio with the higher number of pole pairs on the high speed rotor typically employed in a larger diameter machine (to reduce the required back-iron on the stator and rotor while avoiding magnetic saturation) there will be a high number of pole-pieces around the circumference, therefore limiting the circumferential dimension of the pole-piece. Typically the pole-pieces are relatively square. If the diameter of the machine is limited for a given torque, the machine axial length must increase instead leading to pole pieces with a long and slender aspect ratio.

Further, in order to prevent eddy currents being induced (producing losses and heat) the pole pieces are usually manufactured from, for example, a laminated steel (such as individual sheets of 0.2-0.5 mm thick silicon-iron electrical steel).

Hence, the pole pieces have a poor aspect ratio and have no integral mechanical strength, yet form part of the torque carrying structure of the machine. The pole-pieces are subject to the main drive torque (acting in a circumferential direction), and both a radial pull and torsion about their own axis due to the interaction with the magnetic fields from the permanent magnet rotors and static magnets.

In order to maintain sufficient mechanical strength of the rotor, the pole-pieces would typically be mounted within a support structure or matrix to increase overall rigidity of the pole piece rotor and constrain the deflection of the pole-pieces.

Figure 2:
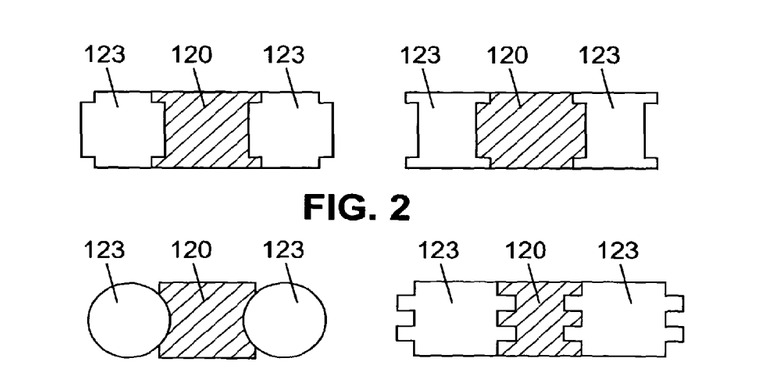
FIG. 2 shows various pole pieces mounted between supporting beams.
Figure 3:
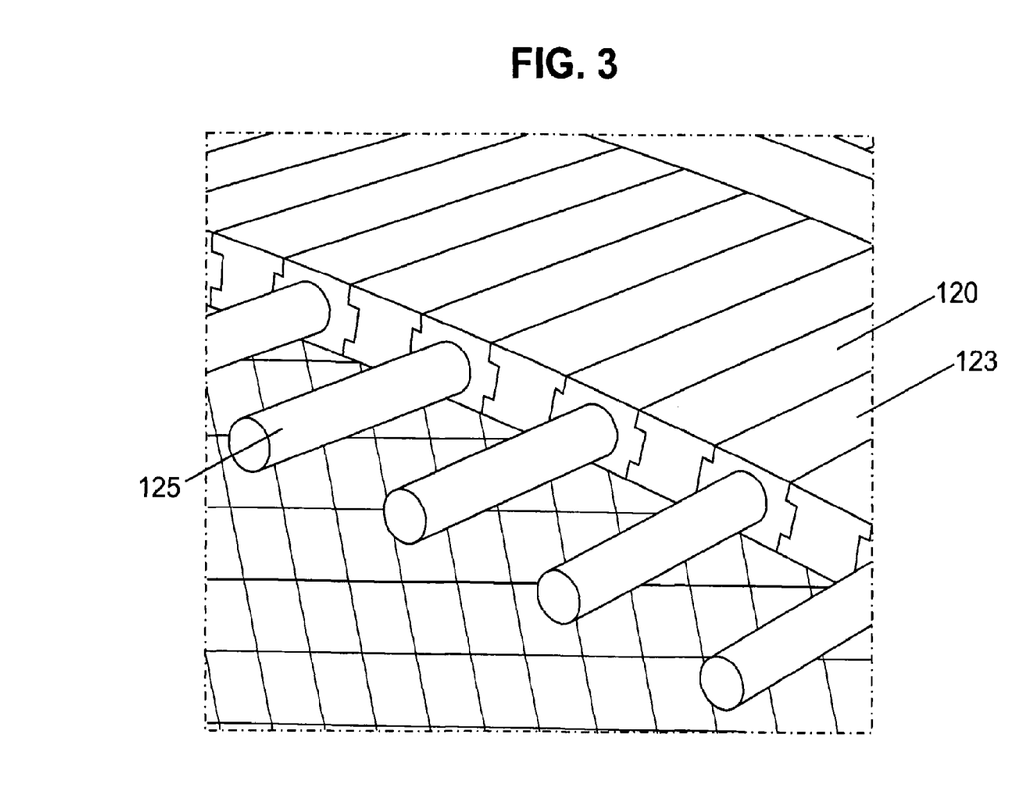
FIG. 3 shows a perspective view of a pole piece rotor including stiffening rods.

WO/2009/138728 also introduces the use of a series of beams 123 which engage with features on pole-pieces 120 as shown in FIGS. 2 and 3. The outermost areas of these shaped beams 123 engage with features on an end-ring/plate to transmit torque to the drive shaft. This document also discusses the use of intermediate retaining rings or stiffening hoops 160 (see FIG. 4) to reduce bending of the beams due to radial forces and provide better support. The stiffening rings partially envelop the pole piece rotor about its circumference, and may protrude radially away from the pole piece rotor.

The manufacture and location of stiffening rings is challenging due to the limited radial depth available between the rotor which comprises the stiffening rings and the rotor or stator disposed radially adjacent to them. Increasing the radial thickness of the stiffening ring either radially outwards or inwards to provide strength to the ring would also increase the required mechanical clearance and hence magnetic airgap between the rotors. The ring strength can be further reduced by the possible requirement for holes for pultrusions to pass through or engage with the ring.

Figure 5A:
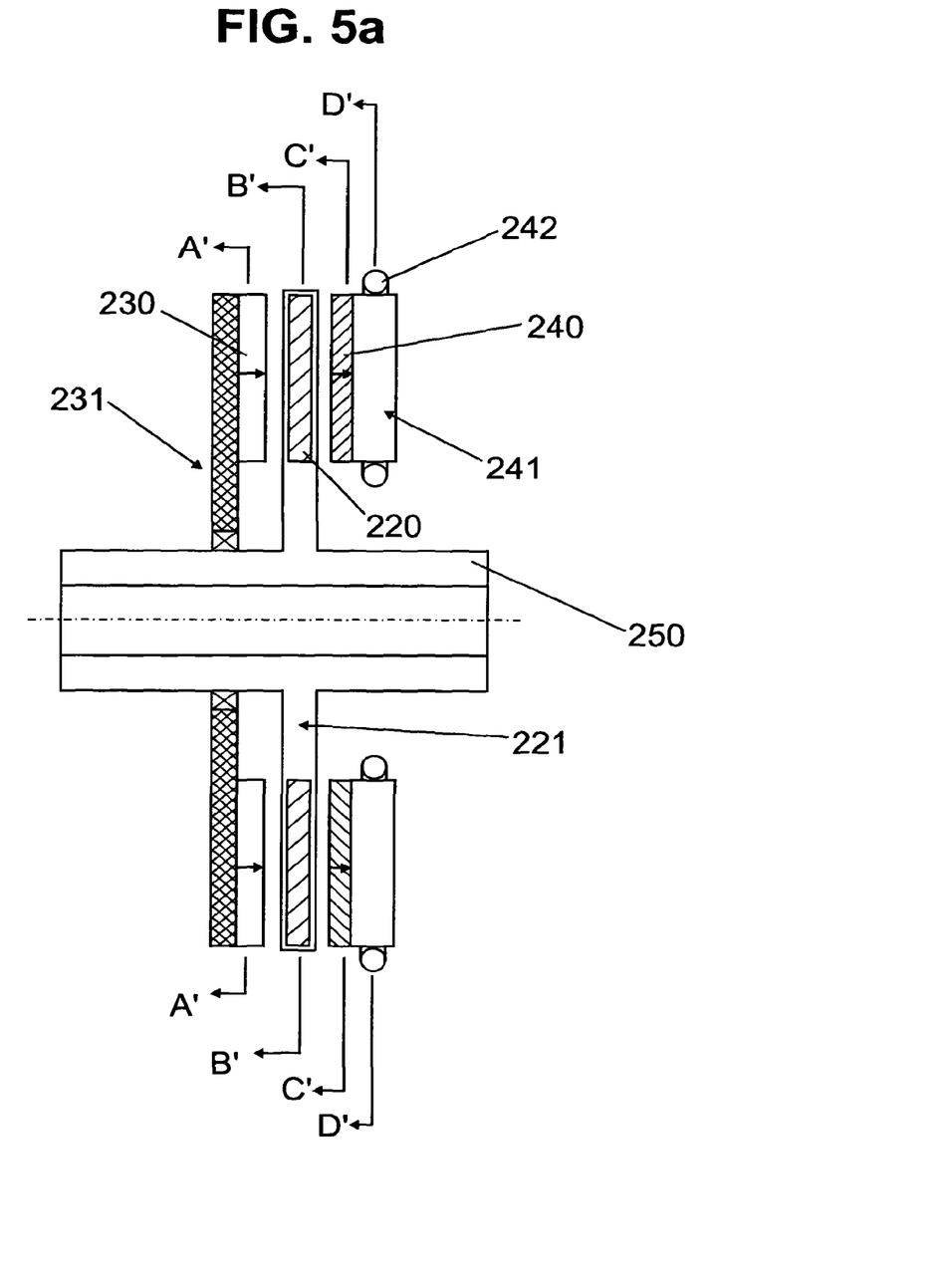
FIG. 5*a* shows a sectional view of an axial field magnetically geared machine.
Figure 5B:
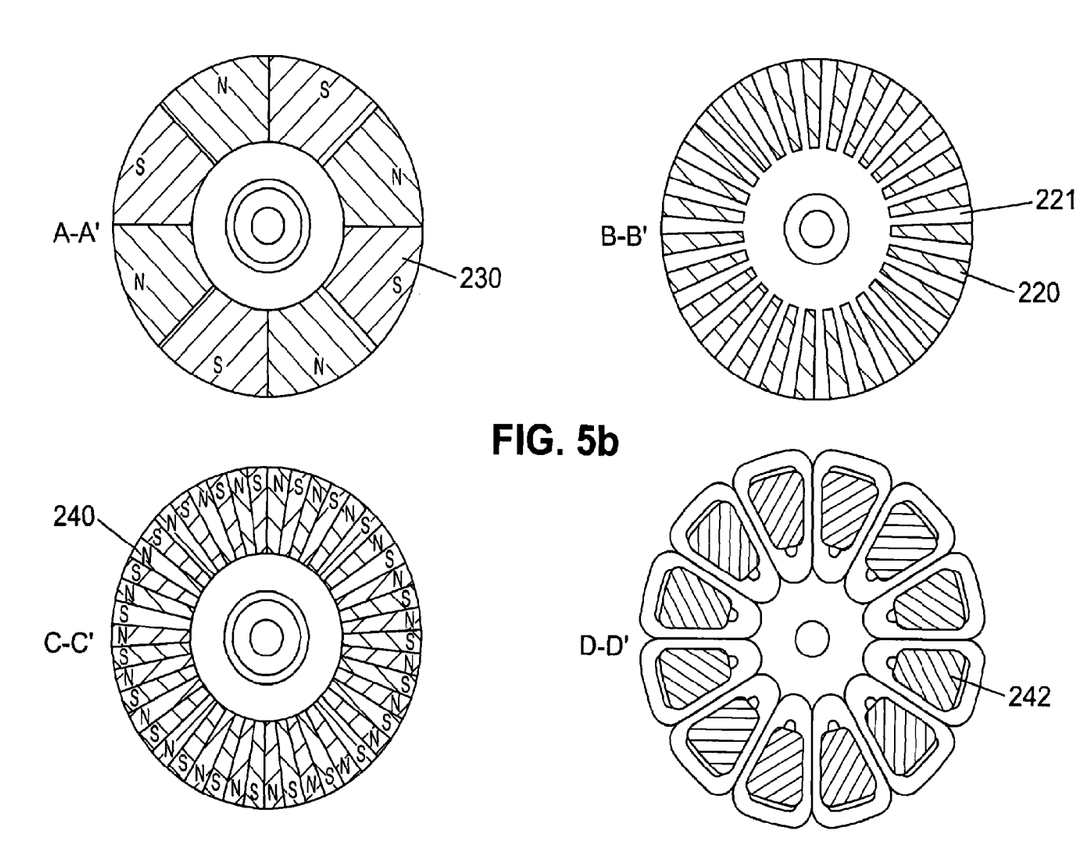
FIG. 5*b* shows a cross-section of the rotors of FIG. 5*a*

An alternative embodiment of an electrical machine with integral magnetic gearing is shown in FIGS. 5a and 5b. In this machine, an axial field machine, the rotors 221, 231 and stator 241 comprise a series of discs or plates disposed about a common axis. Permanent magnets 230 and 240, which are carried by the second rotor 231 and the stator 241 respectively are disposed adjacent pole pieces 220 carried by the first rotor. The permanent magnets 230, 240 and pole pieces 220 are arranged in a radial spoke pattern on the rotors as shown in cross-section in FIG. 5b. Windings 242 are present on the stator 240 which interact with the fundamental excitation flux of the permanent magnets 230 on the second rotor 231. The permanent magnets 230 disposed on the second rotor 231 interact with the spatial harmonic which is produced due to a combination of the stator magnet poles 240 and the pole-pieces 220, such that torque is transferred between the first rotor 221 and the second rotor 231 in a magnetically geared manner. However, such an arrangement is difficult to realise on a large scale because of the unbalanced magnetic pull on the rotors perpendicular to the plane of the rotation which acts to deflect larger diameter rotors.

The present invention aims to solve the above problems and provides an electrical machine comprising a first rotor, wherein the first rotor includes a support structure, a second rotor and a stator. The first rotor, second rotor and stator are arranged concentrically about a shaft, and at least one of the second rotor and the stator is adapted to accommodate the support structure.

Preferably, the first and second rotors are configured to transfer torque therebetween in a magnetically geared manner.

The support structure may be a stiffening ring which at least partially surrounds the first rotor.

The stiffening ring may extend radially from the first rotor.

The electrical machine may further comprise an array of pole pieces, a first plurality of magnets and a second plurality of magnets.

The first plurality of magnets or the second plurality of magnets can be electromagnets or permanent magnets.

Preferably, the array of pole pieces is provided on the first rotor, the first plurality of magnets is provided on the second rotor and the second plurality of magnets is static.

Moreover, the second plurality of magnets is provided on the stator.

In accordance with one embodiment of the present invention, at least one of the second rotor and stator comprises a recess into which the supporting structure extends.

Preferably, the at least one of the second rotor and stator is bisected by a gap into which the support structure extends.

The electrical machine may further comprise a winding, wherein the winding is disposed on the stator.

In one embodiment of the present invention, the winding extends through the recess.

Alternatively, the stator is split into two distinct lamination packs, either side of the gap, each lamination pack having its own winding.

In this embodiment, each winding may be supplied with separate power electronic converters.

In one embodiment of the present invention, the second rotor comprises two rotors bisected by the support structure, the support structure comprising at least one leg extending from the first rotor to the shaft.

The at least one leg may be a connecting plate or disk which extends between the rotor and the shaft.

The magnets of each of the stator lamination packs can be offset circumferentially, so as to reduce cogging torque.

Alternatively, the magnets of each of the respective second rotors and stator lamination packs are offset circumferentially, so as to reduce cogging torque.

Alternatively, the pole pieces may be offset relative to one another.

The electrical machine can be suitable for use in generation and further comprises a shaft, a turbine connected to the shaft, wherein the first rotor rotates with the shaft and wherein the second rotor rotates around the shaft and the first rotor transfers torque to the second rotor in a magnetically geared manner, thereby inducing an AC voltage in the windings.

The turbine may be a wind turbine or a marine current turbine.

Alternatively, the electrical machine may be suitable for use in propulsion and further comprises a shaft, a load connected to the shaft, wherein the first rotor rotates with the shaft and wherein the second rotor rotates around the shaft and the second rotor transfers torque to the first rotor in a magnetically geared manner, in response to a current in the windings.

The load can be a propeller.

A second aspect of the invention provides an electrical machine comprising a shaft, having an axis, at least one first rotor; at least one second rotor; at least two stators. The first rotor, second rotor and stators are arranged axially along the shaft and extend from the axis.

Preferably, the first and second rotors are configured to transfer torque therebetween in a magnetically geared manner.

The electrical machine may further comprise at least two arrays of pole pieces, at least two sets of a first plurality of magnets and at least two sets of a second plurality of magnets.

The first array of pole pieces and a second array of pole pieces may be provided on the first rotor, the at least two sets of the first plurality of magnets are provided on the second rotor and the at least two sets of the second plurality of magnets is static.

Preferably, the second plurality of magnets is provided on a stator

Preferably, each of the first pluralities of magnets are disposed adjacent a respective one of the arrays of pole pieces along the axis of the shaft.

Preferably, each of the second pluralities of magnets are disposed adjacent a respective one of the arrays of pole pieces, along the axis of the shaft.

The first rotor may comprise a first rotor plate and a second parallel rotor plate, and wherein the second rotor is positioned between the two plates.

Preferably, each plate comprises an array of pole pieces.

The electrical machine may comprise a strengthening structure linking the first plate and the second plate.

Preferably, the strengthening structure links the first and second plates at their ends distal to the shaft.

Preferably, the at least two stators surround the first rotor

Preferably, at least one stator comprises a winding.

Preferably both stators comprise a winding and each winding is supplied with separate power electronic converters.

In a further embodiment, one of the at least two stators is a double sided stator and the electrical machine further comprises at least one third rotor, at least a third stator, and the third rotor and third stator extend from the axis and are arranged axially along the shaft from the double sided stator and a portion of the first rotor extends between the third stator and the double sided stator.

Preferably, the third and first rotors are configured to transfer torque therebetween in a magnetically geared manner.

The electrical machine may further comprise a third array of pole pieces and a fourth array of pole pieces, two sets of a third plurality of magnets and at least two sets of a fourth plurality of magnets.

Preferably, the third array of pole pieces and the fourth array of pole pieces are provided on the portion of the first rotor which extends between the third stator and the double sided stator, the two sets of the third plurality of magnets are provided on the third rotor and the fourth plurality of magnets is static.

Preferably, the first set of the fourth plurality of magnets is provided on the double sided stator and the second set of the fourth plurality of magnets is provided on the third stator.

Preferably, each of the third pluralities of magnets is disposed adjacent a respective one of the third and fourth arrays of pole pieces along the axis of the shaft.

Preferably, each of the fourth pluralities of magnets is disposed adjacent a respective one of the third and fourth arrays of pole pieces, along the axis of the shaft.

Preferably, the portion of the first rotor which extends between the third stator and the double sided stator comprises a third rotor plate and a fourth parallel rotor plate, and wherein the third rotor is positioned between the third and fourth plates.

Preferably, each of the third and fourth plates comprises an array of pole pieces.

The electrical machine may further comprise a strengthening structure linking the third plate and the fourth plate.

Preferably, the strengthening structure links the third and fourth plates at their ends distal to the shaft.

Preferably, the second stator is the double sided stator, and the second stator and the third stator surround the third and fourth plates of the first rotor.

The rotor plates may comprise disks.

A relative rotational offset between at least one of the sets of pluralities of magnets or between at least one of the arrays of pole pieces may be present, so as to reduce cogging torque.

Preferably the double sided stator may comprise a winding.

Preferably the double sided stator comprises two windings, and each winding is supplied with separate power electronic converters.

The third stator may comprise a winding.

Preferably, the winding of the third stator has a separate power electronic converter.

Any one of the first to fourth plurality of magnets may be electromagnets or permanent magnets.

The electrical machine can be suitable for use in generation and further comprise a turbine connected to the shaft, wherein the first rotor rotates with the shaft and wherein the second rotor or the second rotor and the third rotor rotates around the shaft and the first rotor transfers torque to the second rotor or the second rotor and the third rotor in a magnetically geared manner, thereby inducing an AC voltage in the windings.

The turbine can be a wind turbine or a marine turbine.

The electrical machine can be suitable for use in propulsion and further comprise a load connected to the shaft, wherein the first rotor rotates with the shaft and wherein the second rotor or the second rotor and the third rotor rotates around the shaft and the second rotor or the second rotor and the third rotor transfers torque to the first rotor in a magnetically geared manner, in response to currents in the stator windings.

The load may be a propeller.

The present invention is discussed in more detail with reference to the drawings in which.

A first embodiment of the present invention, and variations of that embodiment, is now described with reference to FIGS. 3 to 9.

Figure 6:
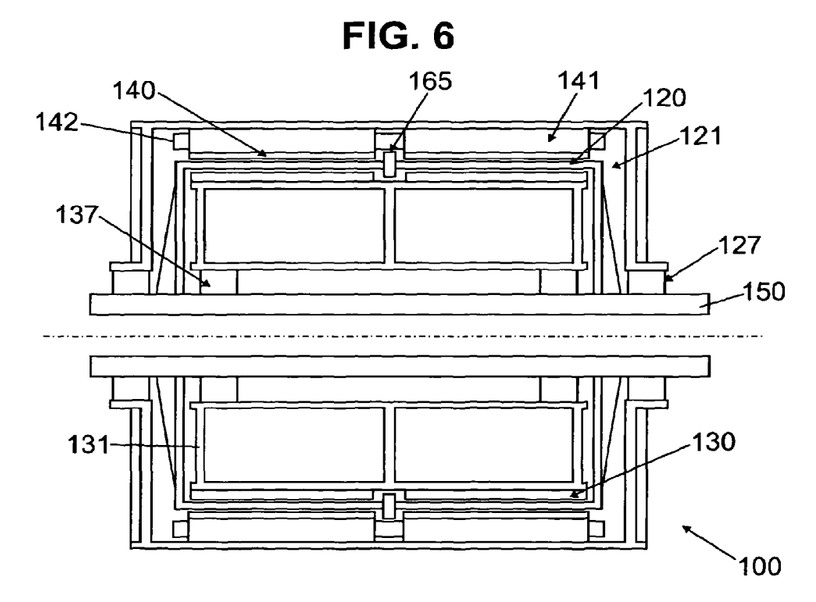
FIG. 6 shows a sectional view of an electrically geared radial machine of the present invention.

FIG. 6 shows an electrical machine 100 in accordance with the present invention having a first, low speed, rotor 121 connected to an input/output shaft 150. The low speed rotor 121 has a plurality of pole-pieces 120 disposed thereon. The electrical machine 100 also has a second, high speed, rotor 131 having a first plurality of permanent magnets 130 disposed thereon and a static stator 141 having a second plurality of permanent magnets 140 and a plurality of windings 142 disposed thereon. Each rotor 121, 131 is arranged to rotate about the axis of the input/output shaft 150 and is mounted using suitable bearings 127, 137.

In motor operation, controlled voltages are supplied to the windings and currents flow which create a rotating field (e.g. 3 phase windings spatially displaced by 120° fed with three phase voltage waveform displaced 120° will establish a rotating field). The fundamental spatial harmonic of this field and the second rotor 131 are arranged to have the same number of poles. The presence of the second plurality of permanent magnets 140 and pole-pieces 120 does not affect this fundamental field. The rotation of the field causes a rotation of the high speed rotor 131. As the second plurality of permanent magnets 140 are fixed and the pole-pieces 120 are free to rotate (providing there is sufficient torque to overcome the load inertia and load torque), the first rotor 121 then rotates at a lower speed than the second rotor 131 through magnetic gearing due to the interaction of the pole pieces 120 with the second plurality of permanent magnets 140. The first rotor 121 is connected to the output load shaft 150 which is subsequently connected to a mechanical load, for example, a vessel propeller.

In generator operation, the first, pole-piece rotor 121 is connected to a drive input shaft 150 (driven by a prime mover such as wind turbine rotor blades). The rotation of the first, low speed, rotor 121 causes the high speed rotor 131 to rotate at a higher speed through the magnetic gearing (due to the interaction of the pole pieces 120 with the second plurality of permanent magnets). The high-speed rotor 131 provides field excitation induced voltages in the stator windings 142, allowing a current to flow when the machine is connected to an electrical load or the grid, for example.

FIG. 6 shows the machine having an external stator 141 in a radial-field configuration in which the rotors are concentric, defining two circumferential airgaps. Alternatively, the machine can be "turned inside-out" having an internal stator, and an external high speed permanent magnet rotor with an intermediate pole-piece array. This has the advantage of putting the large torque bearing elements of the magnetic gear on the largest possible diameter.

The pole pieces 120 are arranged in a radial spoke pattern and are mounted in a non-magnetic support matrix with end-plates connected to the shaft to carry the torque from the shaft to the rotor or vice versa. The support structure is non-magnetic to allow correct modulation of the magnetic fields and is preferably non-conducting to prevent eddy currents and losses being induced in the structure, and is therefore typically a non-metallic structure. The end plates may comprise magnetic material. The pole-pieces 120 could be embedded within a structure (e.g. by resin filling a mould containing the pole-pieces or a pre-cast structure with pockets to insert the pole-pieces as described in WO/2009/087408). Preferably, the pole-pieces 120 should not be completely enclosed to allow some cooling air to impinge on the surfaces.

Figure 4:
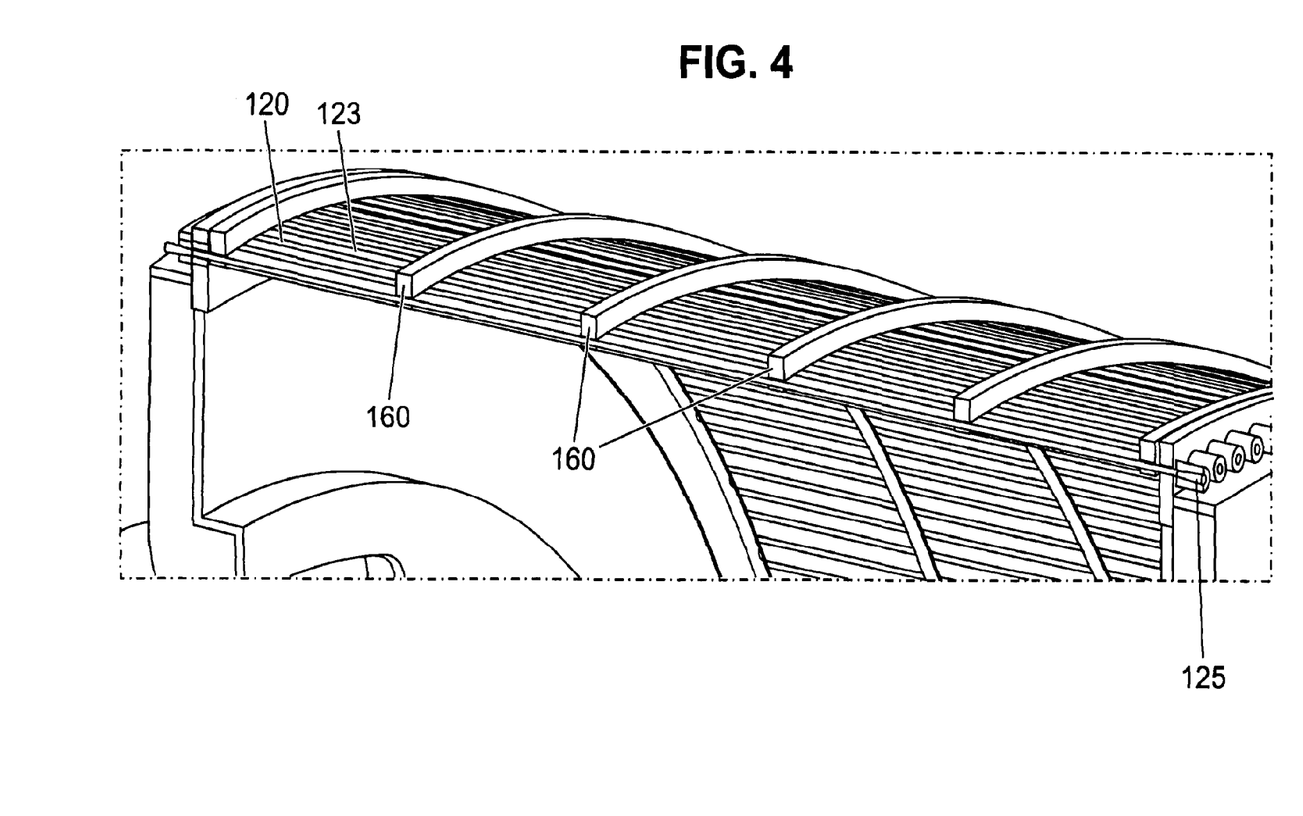
FIG. 4 shows a perspective view of a pole piece rotor having stiffening rings.

Alternatively, a series of beams 123 which engage with features on the pole-pieces 120 can be used, as shown in FIG. 3. These shaped beams 123 engage with features on an end-ring/plate to transmit the torque to the drive shaft. The beams would typically be a carbon-fibre or glass-fibre material or a plastic/ceramic material. The net shape required could be readily manufactured with carbon-fibre pultrusions 123 (where fibres/resin are drawn through a die). To prevent significant bending of the beams 123 and intermediate laminated pole-pieces 120, additional tie-rods 125, preferably non-magnetic and non-conducting, can be located within the pultrusions, as shown in FIG. 4. These tie-rods 125 may then be placed under tension, pretensioning the structure to reduce deflections due to drive torque and magnetic radial forces.

Figure 7A:
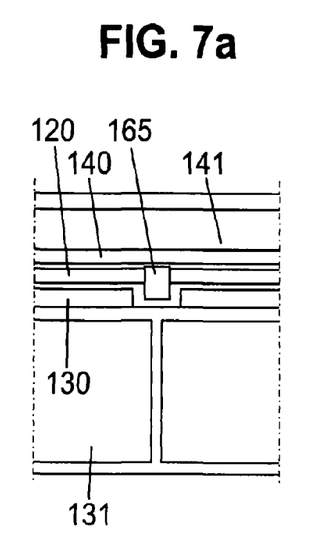
FIG. 7*a* shows a sectional view of a stiffening ring in situ in accordance with the embodiment of FIG. 6.

The first rotor 121 includes a stiffening ring 165 which surrounds the first rotor 121 at an intermediate position along its longitudinal axis. The ring 165 extends radially from the first rotor 121. The point on the stator 141 and/or second rotor 131 toward which the stiffening ring 165 extends does not have magnets 140, 130 disposed thereon, so as to accommodate the ring. Typically, the permanent magnets would have a radial thickness of 10-30 mm. Thus, a recess is formed by the absence of magnets into which the stiffening ring extends. Hence, the radial dimension of the stiffening ring 165 can be extended to further strengthen the rotor without affecting the mechanical clearance, and hence magnetic airgap, between the pole pieces 120 and the magnets 130, 140. The ring may be extended radially inwards, as shown in FIG. 7a, e.g. towards the second, high speed, rotor 131 for an external stator machine, radially outwards as shown in FIG. 7b, e.g. towards the stator 141 for an external stator machine or both as shown in FIG. 7c.

The stiffening ring 165 could be manufactured from steel, but would then potentially have eddy currents induced in it leading to higher losses. Therefore carbon-fibre composite or glass fibre rings may be employed. More than one stiffening ring 165 may be provided at different locations along the longitudinal axis of the rotor.

The ring 165 may have an array of holes for beams 125 to pass through as shown in FIG. 4. The rings may also have a lip or rim which is shaped to mate with the pole pieces and pultrusions to provide location therefor. In this way, the rotor may be assembled by matingly engaging end plates, pole pieces and pultrusions and stiffening rings, and tying them together into a rotor structure using beams that may be tensioned.

Figure 7B:
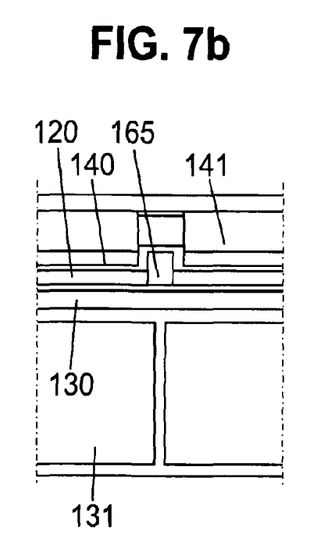
FIG. 7*b* shows a sectional view of an alternative stiffening ring in situ in accordance with the embodiment of FIG. 6.
Figure 7C:
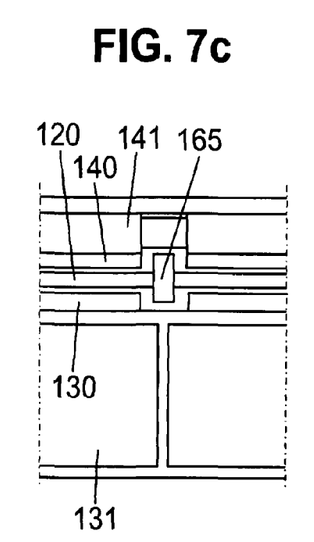
FIG. 7*c* shows a section view of an alternative stiffening ring in situ in accordance with the embodiment of FIG. 6.

In the embodiment shown in FIGS. 7b and 7c, in which the stiffening ring 165 extends towards the stator 141, there are no permanent magnets 140 present on the stator 141 at the section towards which the stiffening ring 165 extends. Hence, it is not necessary to provide stator laminations and this region may be used to allow ventilation (at the mid point of the stack in the described embodiment), thereby improving the temperature profile. The windings may extend through this non-laminated region, and would also be subject to cooling air, again improving the temperature profile.

Figure 8:
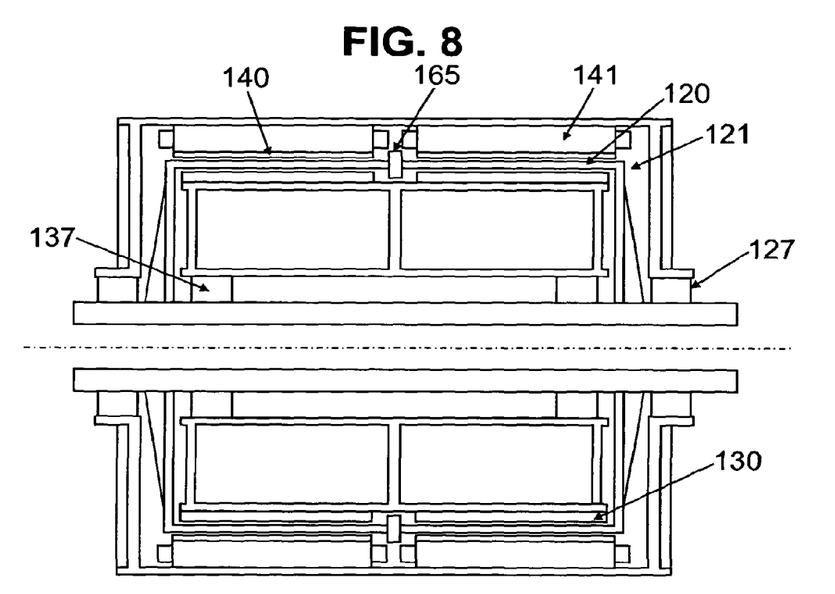
FIG. 8 shows a sectional view of an alternative embodiment of an electrically geared radial machine of the present invention.

Alternatively, the stator may be split into two distinct lamination packs 141a, 141b, as shown in FIG. 8. Thus a gap bisects the stator at the point toward which the stiffening ring extends. In this arrangement both stators may be excited together to operate with the same performance as in the embodiment of FIG. 6, albeit with a slight increase in end winding losses due to the additional set of end windings.

Alternatively, the machine shown in FIG. 8 can be wound with separate windings and supplied with separate power electronic converters that can be selectively energised. This allows for a degree of redundancy, improving fault tolerance.

In a further aspect of the split stator embodiment, the magnets on the stator 141 and second rotor 131 on one half can be rotationally offset by anything up to one pole-pitch such that a rotational offset between the two pairs of magnetic components is introduced. As a result, a phase offset can be introduced between the cogging torques produced by each half, relative to the other. The overall cogging torque may thereby be reduced or even cancelled.

Figure 9:
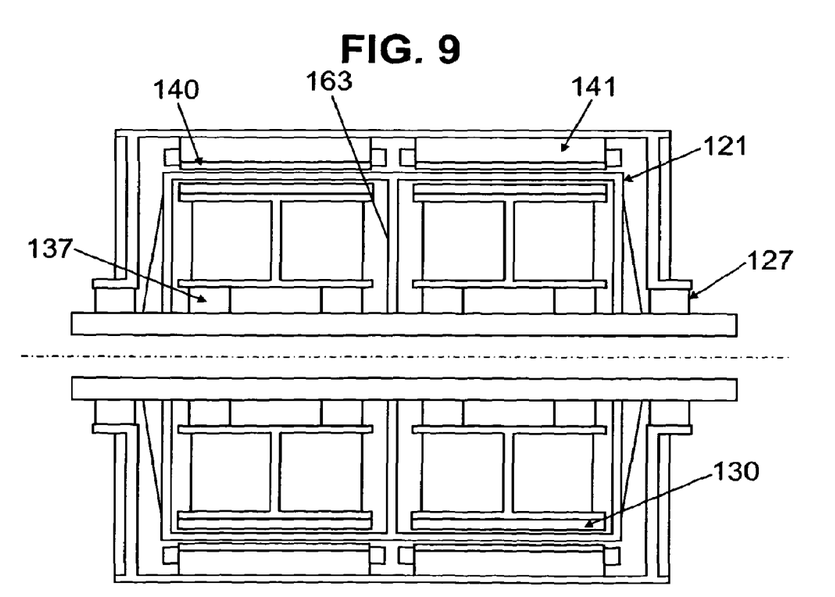
FIG. 9 shows a sectional view of an alternative embodiment of an electrically geared machine of the present invention.

In a further embodiment, shown in FIG. 9, a leg 163 is connected to the stiffening ring 165 and extends through the second rotor 131 to the input/output shaft 150 to which it is attached. The leg 163 may be a circumferential plate or disk. The supporting structure is thus mechanically attached to the high-torque, low speed input/output shaft 150 and splits the first rotor 121. Alternatively, the leg 163 may form the stiffening ring and be attached to the first rotor, providing an extra point of attachment for the first rotor, resulting in a more robust rotor. Such a leg 163 significantly reduces bending of the first, low speed rotor 121 caused by the main circumferential torques. For longer machine lengths, in which more than one stiffening ring 165 may be present, the second rotor 131 may be split or separated by a leg 163 associated with each ring 165. However, this comes with the penalty of requiring further bearing supports for each additional rotor 131.

An alternative embodiment of the present invention is now described with reference to FIGS. 10 to 12.

Figure 10:
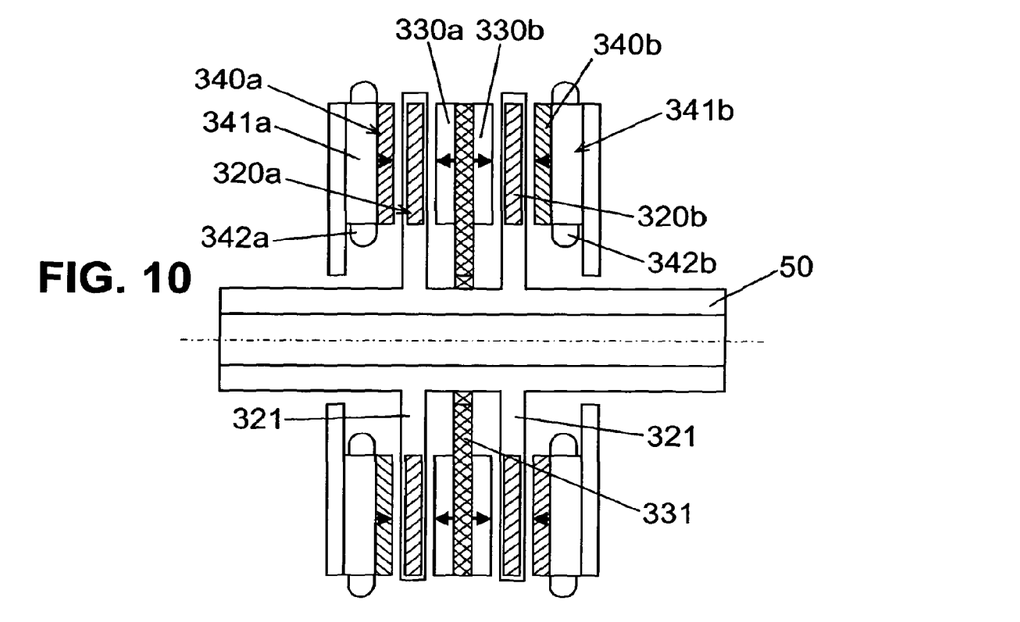
FIG. 10 shows a sectional view of an axial field electrically geared machine of the present invention.

A double-sided axial machine arrangement is a significant enhancement of the embodiment of FIG. 5, and is shown in FIG. 10. In this double sided arrangement, the first rotor 321 includes two sets of pole pieces 320a, 320b, each disposed on a plate which forms a part of the first rotor 321. The first rotor 321 comprises two plates spaced apart from one another along the axis of the shaft, and is connected to the low speed input/output shaft 50. The second rotor 331 also comprises two sets of permanent magnets 330a, 330b each disposed adjacent a respective one of the sets of pole pieces 320a, 320b of the first rotor 321 along the axis of the turbine 50. The second rotor 331 is free to rotate relative to the shaft 50 (and thus the first rotor) and is disposed between the plates of the first rotor 321. One or more stators 341a, 341b carrying permanent magnets 340a, 340b and windings 342a, 342b are disposed adjacent each of the two sets of pole pieces 320a, 320b, along the axis of the turbine. The stators 341a, 341b are positioned along the axis of the shaft on a side of a plate of the first rotor 321 opposite to the second rotor 331. The permanent magnets 330a, 340a, 330b, 340b and pole pieces 320a, 320b interact in a magnetically geared way, as described below.

In motor operation, controlled voltages are supplied to the windings 342a, 342b and currents flow which create a rotating field (e.g. 3 phase windings spatially displaced by 120° fed with three phase voltage waveform displaced 120° will establish a rotating field). The fundamental spatial harmonic of this field and the permanent magnets 330a, 330b of the second rotor 331 are arranged to have the same number of poles. The presence of the second plurality of permanent magnets 340a, 340b and pole-pieces 320a, 320b does not affect this fundamental field. The rotation of the field causes a rotation of the second rotor 331. As the second plurality of permanent magnets 340a, 340b is fixed and the pole-pieces 320a, 320b are free to rotate (providing sufficient torque to overcome the load inertia and load torque), the first rotor 321 then rotates at a lower speed than the second rotor 331 through magnetic gearing due to the interaction of the pole pieces 320a, 320b with a harmonic of the rotating magnetic field of the second plurality of permanent magnets 340a, 340b. The first rotor 321 is connected to the output load shaft 50 which is subsequently connected to a mechanical load, for example, a vessel propeller.

In generator operation, the first, pole-piece rotor 321 is connected to a drive input shaft 50 (driven by a prime mover such as wind turbine rotor blades). The rotation of the first, low speed, rotor 321 causes the second rotor 331, which is not mechanically connected to the shaft, to rotate at a higher speed through the magnetic gearing (due to the interaction of the pole pieces 320a, 320b with the second plurality of permanent magnets 330a, 330b). The rotation of the permanent magnets 330a, 330b on the second rotor 331 provides field excitation induced voltages in the stator windings 342a, 342b, allowing a current to flow when the machine is connected to an electrical load or the grid, for example.

Of course, the pole pieces and two sets of plurality of magnets can be arranged differently on the rotors. For example, the pole pieces may be static and the first rotor may comprise a first plurality of magnets. The first rotor may be the high speed rotor, and that rotor disposed within it may be the low-speed rotor. Alternatively, the stator may be disposed within the first rotor.

The unbalanced forces on the rotors along the axis which arise in the axial field embodiment shown in FIG. 5a are diminished due to the fact that the rotors are subject to magnetic pull in both directions along the axis. The second rotor has two sets of permanent magnets 330a, 330b, each of which interact with a second set of permanent magnets 340a and 340b and pole pieces 320a, 320b respectively in an opposed axial direction. Hence the first rotor 331 is subject to a balanced force in each axial direction making the rotor itself less likely to bend or fail and alleviating the axial thrust forces on the bearings.

Moreover, the additional magnetic surfaces also increase the active torque producing surface and higher torques can be produced.

Figure 11:
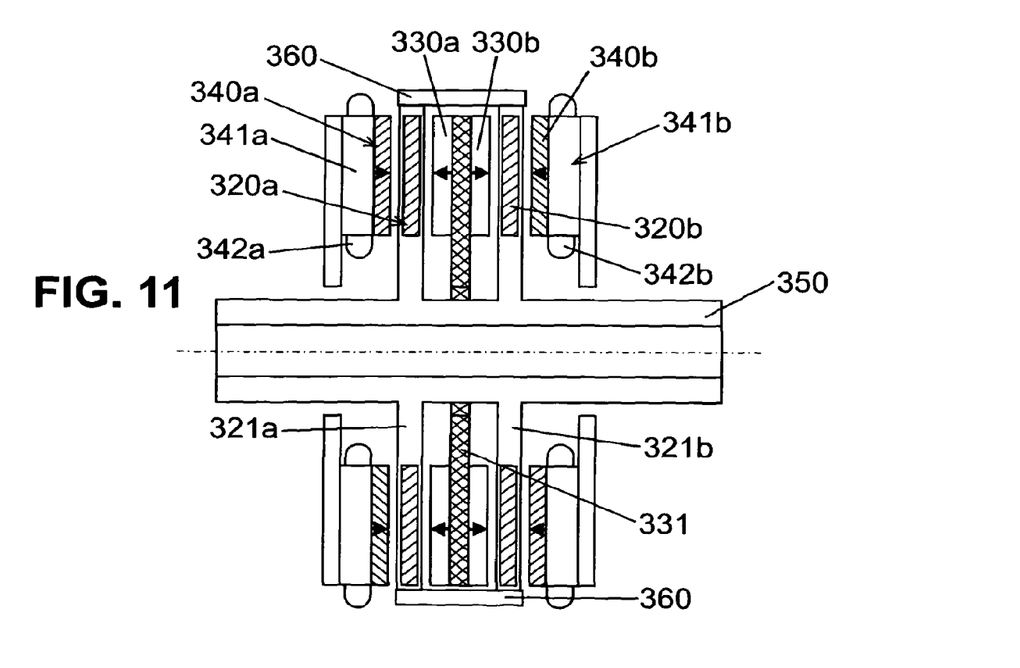
FIG. 11 shows a sectional view of an alternative axial field electrically geared machine of the present invention.

In an alternative embodiment as shown in FIG. 11, the plates on the first, pole piece rotor can be connected together at an end distal to the input/output shaft 50 with a strengthening tube or structure 360. This provides a more robust pole-piece rotor 321 which would otherwise only be fixed at the input/output shaft 50 and subject to a large force at its edges, particularly in large-scale realisation of such a machine having large diameter rotors. The structure could comprise of a number of struts dispersed around the circumference of the plates, or a single structure joining to the plates along their entire circumference. This latter arrangement allows the seating of the high speed rotor within the low-speed rotor which may be advantageous in some applications; e.g. in a marine environment this would avoid ingress of water into the air gap surrounding the high speed rotor, thus avoiding erosion and other difficulties associated with that environment.

As with the tandem stator/rotor shown in FIG. 9, an offset can be applied between two sections of the permanent magnets, 340, 320 to reduce torque cogging. It may also be possible to design the magnetic interaction such that the bending modes on the pole pieces 320 may be cancelled. However, care must be taken not to cause a cancellation of the main torque.

The windings can be supplied with separate power energy converters that can be selectively energised, allowing for a degree of redundancy and fault tolerance.

Figure 12A:
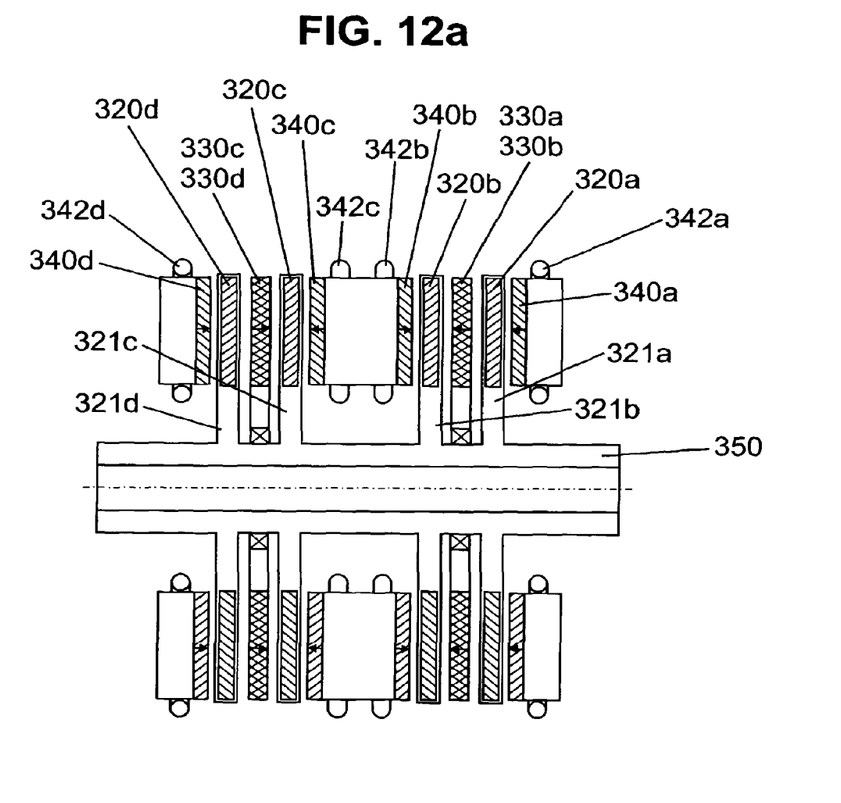
FIG. 12*a* shows a sectional view of an expanded axial field electrically geared machine of FIG. 10.
Figure 12B:
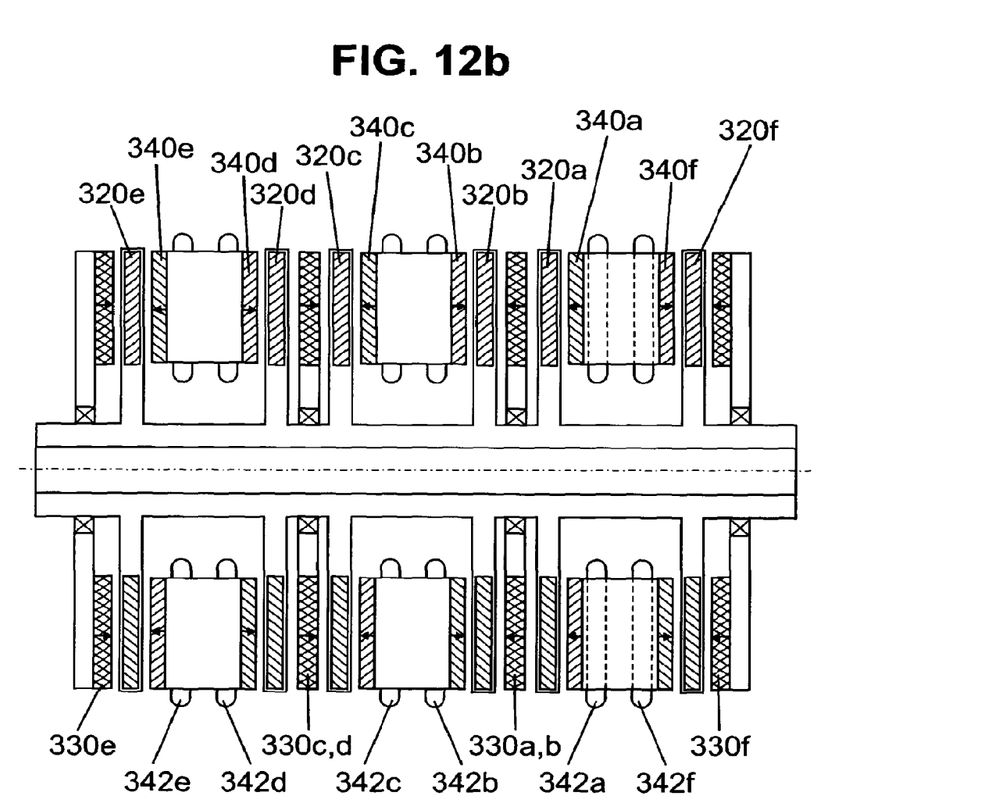
FIG. 12*b* shows a section view of a further expanded axial field electrically geared machine of FIG. 10.

As shown in FIGS. 12a and 12b, multiple stacks of axial field magnetically geared units could be employed. In the embodiment shown in FIG. 12a, a double sided stator, i.e. one having two sets of plurality of permanent magnets 340b, 340c disposed on either side thereof is provided. The first rotor is then provided with four plates, each of which are thus mechanically connected to the low-speed input/output shaft, each having a set of pole pieces 320a, 320b, 320c and 320d disposed thereon. The plates are provided in pairs, each being are provided either side of the double sided stator such that permanent magnets 340b are positioned adjacent pole pieces 320b and permanent magnets 340c are positioned adjacent pole pieces 320c for example. A further set of a plurality of permanent magnets 340a is provided on a stator positioned adjacent pole pieces 320a. A further set of a plurality of permanent magnets 340d is provided on a stator positioned adjacent pole pieces 320d. A high speed rotor having two sets of a plurality of permanent magnets 330a, 330b is disposed between the plates carrying pole pieces 320a and 320b. A further high speed rotor having two sets of a plurality of permanent magnets 330c, 330d is disposed between the plates carrying pole pieces 320c and 320d. The two high speed rotors are free to move relative to the shaft 50.

In generator use, due to the magnetic coupling between the first rotor and the high speed rotors, the low speed rotation of the plates of the first rotor is transferred to the high speed rotors in a magnetically geared manner through interaction of the pole pieces (320a; 320b; 320c; 320d) with the static sets of permanent magnets (340a; 340b; 340c; 340d). The high-speed rotors then produce an excitation field which generates a current in the windings (342a; 342b; 342c; 342d) disposed on the respective stators.

In motor use, controlled voltages are supplied to the windings (342a; 342b; 342c; 342d) and currents flow which create a rotating field. The rotation of the field causes rotation of the high speed rotors. Due to the magnetic coupling between the first rotor and the high speed rotors, torque is transferred from the high speed rotors to the plates of the first rotor in a magnetically geared manner through interaction of the pole pieces (320a; 320b; 320c; 320d) with the static sets of permanent magnets (340a; 340b; 340c; 340d).

This arrangement can be repeated along the axis of the shaft, increasing the number of double sided stators and high speed rotors, and plates of the first rotor and providing a set of pole pieces 320e, 320f on each plate as shown in FIG. 12b, either ending in a single stator, or a high speed rotor comprising a single set of a plurality of permanent magnets.

These embodiments provide high torque in areas in which diameter is restricted but there is more freedom in length. The stiffening structure between the rotors carrying the pole pieces may also be employed within this arrangement.

Although the above embodiments have concentrated on permanent magnet excited motors, the excitation on the high speed-rotor may be provided by a field coil or an electromagnet. A wound field electrical machine is preferably employed in a radial field form with a high-speed rotor and an external stator for simplicity and ease of manufacture. The static pole array can still be produced by an array of permanent magnets rather than electromagnets although using static wound electromagnet arrays is also an option. If wound electromagnetic arrays are used, a controllable field source for the generator is obtainable, improving the control over the system.

One skilled in the art understands how to select and design the pole pieces given the first and second set of permanent magnets to achieve the necessary magnetic circuit or coupling to provide gearing between the first rotor and the second rotor, as can be appreciated from, for example, K Atallah, D. Howe, "A novel high-performance magnetic gear", IEEE Transactions on Magnetics, Vol. 37, No. 4, pp. 2844-2846, 2001 and K Atallah, S. D. Claverly, D. Howe, "Design, analysis and realisation of a high performance magnetic gear", IEE Proceedings-Electric Power Applications Vol. 151, pp. 135-143, 2004, which are incorporated herein by reference in their entirety.

All of the embodiments described above, and shown in FIGS. 6 to 12, address the problems in realising large scale magnetically geared electrical machines for use either in energy generation or propulsion. In particular, a more robust pole piece rotor and a more robust axial field machine is provided. The axial field machine also provides a configuration of rotors which can be arranged to provide more torque in areas where the diameter of the rotors cannot be increased but the axial length of the machine can.

As stated previously, any of the improved machines of the embodiments of this invention can be employed in large scale generation and/or propulsion activities, for example. They are particularly suited for marine generation and propulsion application, and to wind generation applications. However, their utility in many other applications will be evident to the skilled person, and therefore the invention is not limited to the disclosed examples; it is limited only by the scope of the appended claims.

The invention claimed is:

1. An electrical machine comprising:
    a first rotor, wherein the first rotor includes a support structure;
    a second rotor;
    a stator; and,
    wherein the first rotor, second rotor and stator are arranged concentrically about a shaft, and at least one of the second rotor and the stator is adapted to accommodate the support structure.

2. The electrical machine of claim 1, wherein the first and second rotors are configured to transfer torque therebetween in a magnetically geared manner.

3. The electrical machine of claim 1, wherein the support structure is a stiffening ring which at least partially surrounds the first rotor.

4. The electrical machine of claim 3, wherein the stiffening ring extends radially from the first rotor.

5. The electrical machine of claim 1 further comprising:
    an array of pole pieces;
    a first plurality of magnets; and
    a second plurality of magnets.

6. The electrical machine of claim 5, wherein the first plurality of magnets or the second plurality of magnets are electromagnets or permanent magnets.

7. The electrical machine of any one of claim 5, wherein:
    the array of pole pieces is provided on the first rotor;
    the first plurality of magnets is provided on the second rotor; and the second plurality of magnets is static.

8. The electrical machine of claim 7, wherein the second plurality of magnets is provided on the stator.

9. The electrical machine of claim 1, wherein the at least one of the second rotor and stator comprises a recess into which the supporting structure extends.

10. The electrical machine of claim 1, wherein the at least one of the second rotor and stator is bisected by a gap into which the support structure extends.

11. The electrical machine of claim 1 further comprising a winding, wherein the winding is disposed on the stator.

12. The electrical machine of claim 11, wherein the at least one of the second rotor and stator is bisected by a gap into which the support structure extends and the winding extends through the gap.

13. The electrical machine of claim 11, wherein the at least one of the second rotor and stator is bisected by a gap into which the support structure extends and the stator is split into two distinct lamination packs, on either side of the gap, each lamination pack having its own winding.

14. The electrical machine of claim 13, wherein each winding is supplied with separate power electronic converters.

15. The electrical machine of claim 7 wherein the second rotor comprises two rotors bisected by the support structure, the support structure comprising at least one leg extending from the first rotor to the shaft.

16. The electrical machine of claim 15, wherein the at least one leg is a connecting plate or disk which extends between the rotor and the shaft.

17. The electrical machine of claim 13, wherein each of the stator lamination packs include magnets that are offset circumferentially, so as to reduce cogging torque.

18. The electrical machine of claim 15, wherein each of the respective second rotors and stator lamination packs include magnets that are offset circumferentially, so as to reduce cogging torque.

19. The electrical machine of claim 15, wherein the pole pieces of the array of pole pieces are offset relative to one another.

20. The electrical machine of claim 11, for use in generation, further comprising:
 a shaft;
  a turbine connected to the shaft, wherein the first rotor rotates with the shaft and wherein the second rotor rotates around the shaft and the first rotor transfers torque to the second rotor in a magnetically geared manner, thereby inducing an AC voltage in the windings.

21. The electrical machine of claim 11, for use in propulsion, further comprising:
 a shaft;
  a load connected to the shaft, wherein the first rotor rotates with the shaft and wherein the second rotor rotates around the shaft and the second rotor transfers torque to the first rotor in a magnetically geared manner, in response to a current in the windings.

22. The electrical machine of claim 20, wherein the turbine is a wind turbine.

23. The electrical machine of claim 20, wherein the turbine is a marine current turbine.

24. The electrical machine of claim 21, wherein the load is a propeller.

* * * * *